United States Patent [19]
Genovese

[11] 4,084,343
[45] Apr. 18, 1978

[54] ADJUSTABLE EYELESS FISHING ROD

[76] Inventor: Nunzio N. Genovese, 6703 Balsam Dr., Bedford Heights, Ohio 44146

[21] Appl. No.: 732,757

[22] Filed: Oct. 15, 1976

[51] Int. Cl.² ............................................. A01K 87/06
[52] U.S. Cl. .......................................... 43/22; 43/23; 43/24
[58] Field of Search ................... 43/18 R, 18 GF, 22, 43/23, 24, 25, 27.4

[56] References Cited
U.S. PATENT DOCUMENTS

| | | | |
|---|---|---|---|
| 2,394,706 | 2/1946 | Makie | 43/24 |
| 2,514,950 | 7/1950 | Harrington | 43/23 |
| 2,541,609 | 2/1951 | Pullan | 43/18 R |
| 2,699,622 | 1/1955 | Stevens | 43/23 |
| 2,955,376 | 10/1960 | Zeigler | 43/22 |
| 3,068,603 | 12/1962 | Zeigler | 43/22 |
| 3,618,253 | 11/1971 | Edwards et al. | 43/22 |

*Primary Examiner*—Louis G. Mancene
*Assistant Examiner*—Robert P. Swiatek

*Attorney, Agent, or Firm*—Maky, Renner, Otto & Boisselle

[57] ABSTRACT

An eyeless fishing rod including a holder portion which may be adjusted for alignment of a fishing line guide with reels of different sizes to allow only a minimum amount of rubbing friction against the line and without exposing the line to any sharp edges that might cut the line or cause the same to bind. The reel is secured to the holder portion by an overcenter cam lock mechanism which may be adjustably positioned so that different sized reel base plates may be accommodated, either by positioning the cam mechanism in slots of different depths or by adjusting a set screw. A roller guide may be provided at the outer end of the rod portion to reduce drag or any binding which may occur when heavy loads are placed upon the fishing line. A handle extension may be attached to the holder portion for added leverage and to provide additional watertight storage space. The fishing line may be threaded through the hollow of the rod portion by attaching a shuttle to the fishing line which is then cast out through the rod portion thus drawing the line with it.

16 Claims, 12 Drawing Figures

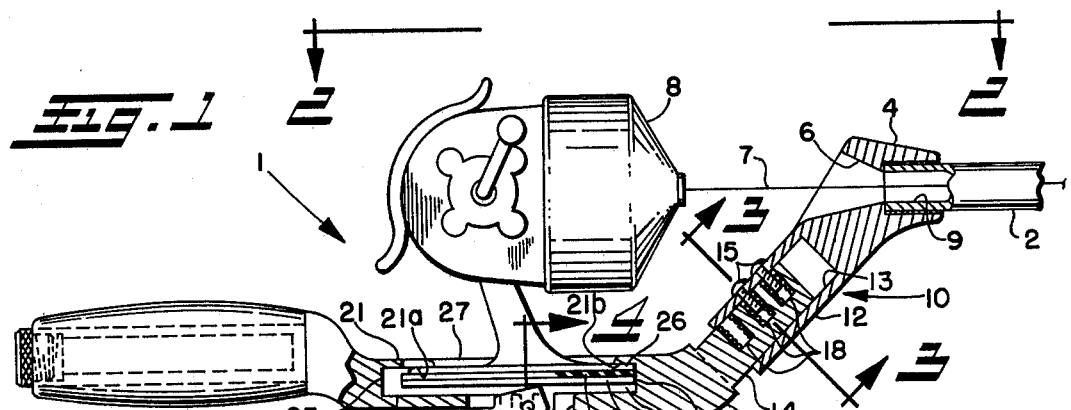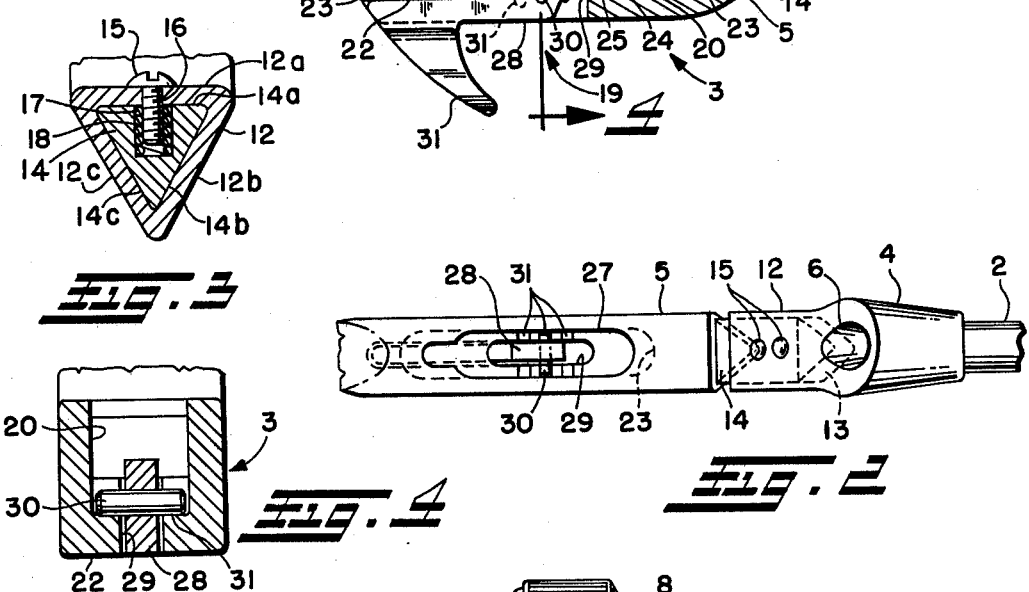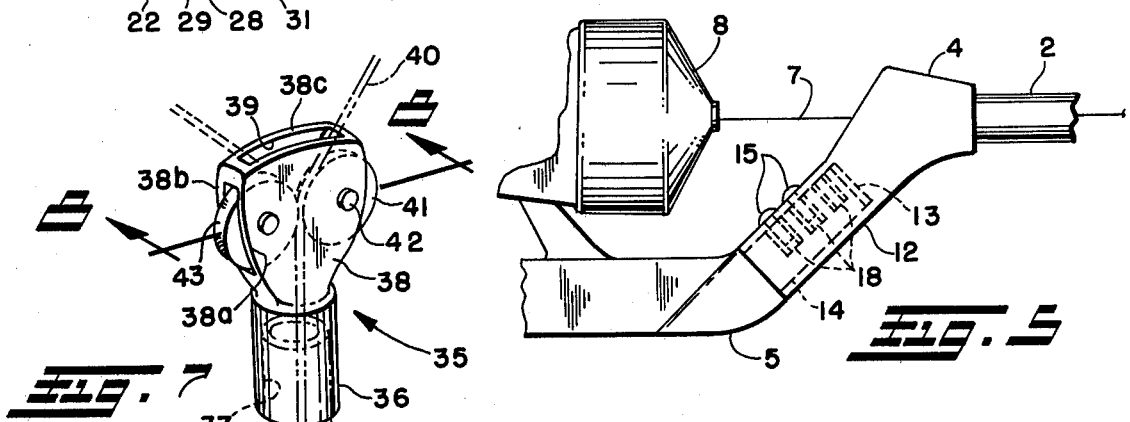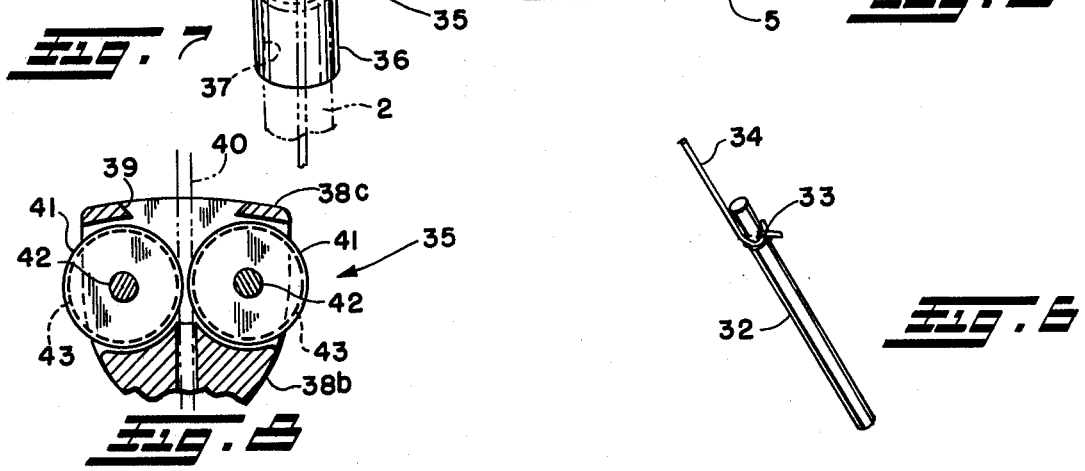

ADJUSTABLE EYELESS FISHING ROD

BACKGROUND OF THE INVENTION

The present invention is directed to eyeless fishing rods and to reel mounting mechanisms generally of the type disclosed in applicant's copending application Ser. No. 623,671, filed Oct. 20, 1975, now U.S. Pat. No. 4,020,581, granted May 3, 1977. The rod portion of such prior application contains a universal guide for guiding the fishing line from reels of various sizes through the center of the rod portion while eliminating any direct contact of the fishing line with any sharp or even slightly tapered smooth guiding surfaces. Even though the fishing rod as disclosed can accommodate many different reel sizes, undesirable drag may still result when the reels significantly vary in size. Consequently, it is desirable that the guide be as directly aligned with the reel as possible.

A reel mounting mechanism is also provided for attachment of various sizes and types of reels thereto. However, some of the reels on the market today have base mounting plates which vary considerably in dimensions, and the fixed position of the cam locking arrangement and the limited compressibility of the resilient cover attached to the surface of the locking plate somewhat limit the range of sizes of base mounting plates which could be accommodated.

In deep-sea fishing, a relatively long handle for gripping the fishing rod to obtain increased leverage is generally used. In contrast, light fly fishing requires a lighter fishing rod without the longer handle. Therefore, it is desirable to furnish a readily adaptable handle to provide versatility as to the types of use of the fishing rod. Also, in deep-sea fishing where heavier fish are being sought, the drag on the end of the fishing rod may become excessive so as to interfere with the operation of the fishing rod or possibly break the line. The reduction of such drag and the possibility of breakage is always desirable.

SUMMARY OF THE INVENTION

The eyeless fishing rod of the present invention has a guide adjusting mechanism for aligning a universal guide with different sized fishing reels in order to minimize the amount of rubbing contact between the fishing line and the fishing rod. Also, because the base plates of reels vary considerably in dimensions, the present invention provides for locating the pivot for the cam locking mechanism in different slots of different depths to accommodate the various sized base plates. Alternatively, or in addition thereto, the cam surface which engages the locking plate in the cavity may be adjusted by varying the relatively highest point of the cam surface to accommodate various sized reel plates.

The present invention also contemplates providing a handle which may be readily adapted to different lengths when desired. The end cap of the handle may be removed and an extension connected thereto to obtain greater leverage when holding the fishing rod, which is especially desirable for deep-sea fishing. Also, because of the increased tension upon the line at the end of the rod portion when heavier fish are sought, the present invention contemplates providing a tip guide mechanism for guiding the fishing line from the rod portion with minimal friction.

The fishing line may be easily threaded through the hollow rod portion by attaching the line to a shuttle which is then cast through the rod portion drawing the line with it. This eliminates the difficulty which might otherwise be encountered in threading eyeless fishing rods because of limited access to the fishing line within the hollow of the rod portion.

With the foregoing in mind, it is a primary object of the invention to provide a novel eyeless fishing rod of the type described.

A further object is to provide for secure locking of reels with base mounting plates of considerably different size.

A further object is to provide for easy threading of the fishing line through the hollow of the fishing rod.

A further object is to provide a versatile fishing rod which may be adapted to the many types of fishing.

Another object is to provide for better handling of the fishing rod and increased storage space within the rod.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a side elevation view, partly in section, showing the holder portion with a fishing seal attached thereto and part of the rod portion;

FIG. 2 is a top plan view of part of the fishing rod looking in the direction of the arrows 2—2 of FIG. 1, but with the fishing reel end locking plate removed to expose the transfer slots, and to show the adjustable handle portion in an extended position;

FIG. 3 is a section view of the holder portion along the line 3—3 depicting the cooperation of the front holder portion and rear holder portion;

FIG. 4 is an enlarged section view of the holder portion taken along the lines 4—4 showing the cam locking mechanism in one of the transfer slots in its locked position;

FIG. 5 is a side elevation view of part of the fishing rod depicting the guide adjusting mechanism in its fully retracted position;

FIG. 6 is a perspective view of the shuttle with the fishing line attached thereto;

FIG. 7 is a perspective view of the tip guide mechanism showing the fishing line positioned therein;

FIG. 8 is an enlarged view, partly in section, of the tip guide mechanism showing the cooperation of the roller guides with the fishing line;

Figure 9:
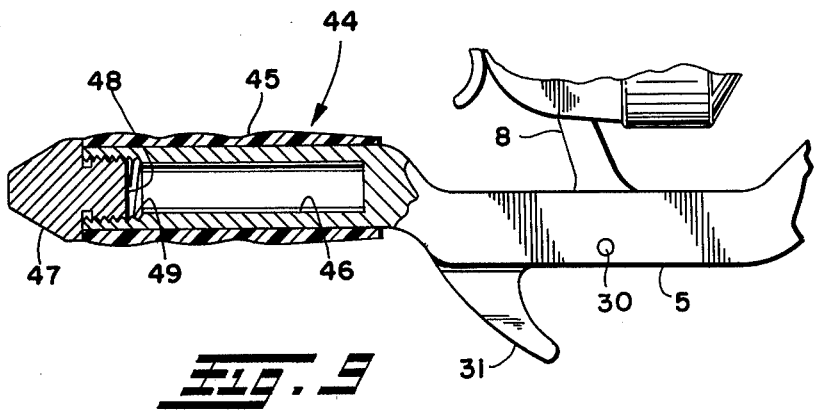
FIG. 9 is a fragmentary side elevation view, partly in section, of the handle part of the holder portion.

11, but depicting another arrangement of the set screw within the cam locking mechanism.

DESCRIPTION OF THE PREFERRED EMBODIMENT

Referring now more particularly to the drawing, wherein like reference numerals designate like parts in the several figures, the eyeless fishing rod of the invention is generally designated at 1 in FIG. 1. The fishing rod 1 includes an elongated rod portion 2, not fully shown, and a holder portion 3 having a front holder portion 4 and rear holder portion 5. The front holder portion 4 has a universal guide 6 which guides a fishing line 7 from the reel 8 into the hollow 9 of the rod portion 2.

A guide adjusting mechanism for aligning the universal guide 6 with different sized reels 8 and for interconnecting the front holder portion to the rear holder portion 5 is generally designated at 10. Such guide adjusting mechanism 10 may be formed as by providing an outer extension 12 on the front holder portion 4 forming an opening 13, and an oblique inner extension 14 on the rear holder portion 5 slidably extending into the opening 13 of the outer extension 12. As best shown in FIG. 3, the outer extension 12 is of a triangular section having sides 12a, 12b and 12c. The inner extension 14 is of similar triangular cross section of slightly smaller dimensions having outer surfaces 14a, 14b and 14c corresponding to sides 12a, 12b and 12c, respectively. The outer extension 12 is secured to the inner extension 14 after adjustment by one or more screws 15 passing through holes 16 in the side 12a and threadably engaging threaded helical inserts 17 in openings 18 in the top surface 14a of the inner extension 14.

In the preferred embodiment, there are two such screws 15 received in two holes 16 in the outer extension 12 desirably spaced approximately ½ inch apart, with three similarly spaced openings 18 and helical inserts 17 in the inner extension, whereby the two screws 15 may be aligned with either the upper and middle or middle and lower openings to provide two adjusting positions for the universal guide 6. When relatively large reels are used, the universal guide 6 is in its extended position and the screws 15 are inserted into the outer two openings 18 of the inner extension 14 as best shown in FIG. 1. When smaller reels are used, the adjusting mechanism is in its retracted position and the screws 15 are inserted into the innermost openings 18 of the inner extension 14 as best shown in FIG. 5.

The fishing reel 8 is secured to the holder portion 3 by a cam locking mechanism generally designated at 19 in FIG. 1. The locking mechanism 19 includes a cavity 20 in the holder portion 3 defined by top, bottom and side walls 21, 22 and 23, respectively. Contained in the cavity 20 is a substantially rigid locking plate 24 with cushion strip 25 of rubber of rubber-like material glued or otherwise secured to the upper surface of the plate 24 for compressive engagement with the bottom surface of the reel base mounting plate 26 for releasably locking the plate 26 within the cavity 20 in a manner to be described. The thickness of the locking plate 24 together with its cover strip 25 is less than the depth of the cavity 20 measured from the top wall 21 to the bottom wall 22 in order to allow the base support mounting plate 26 of a reel 8 to be inserted through an opening 27 in the top wall 21 into the cavity 20 for engagement with the strip 25. The dimensions of the opening 27 are such as to permit the reel base mounting plate 26, which has a length greater than the length of the opening 27, to be inserted into the cavity and its position adjusted so that the opposite ends of the reel base mounting plate are located beneath the top portions 21a and 21b of the top wall 21 bounding the opening 27. The back wall of the opening 27 may be slotted, as best seen in FIG. 2, for receipt of the shaft of a milling cutter to permit undercutting of the cavity 20 therebeneath to the depth shown.

Referring now more particularly to FIGS. 1 and 4, the cam locking mechanism 19 also includes a cam 28 positioned in a longitudinal opening 29 in the bottom wall 22 of the holder portion 3, the top of the cam 28 extending into the cavity 20 for engagement with the base locking plate 24 for urging same against the reel base mounting plate 26 and into abutment with the top portions 21a and 21b of the top wall 21 when the cam 28 is in its fully locked position. The cam 28 is pivoted around a pin 30 by rotating the trigger 31.

In the preferred form shown, the pin 30 is supported within one of a plurality of transfer slots 31 in the bottom wall 22 each of different depths. By transferring the cam pin 30 from one slot to another slot, the extension of the cam 28 into the cavity 20 is varied to accommodate different sizes of reel base mounting plates. As shown in FIG. 2, the transfer slots 31 are positioned transversely to the longitudinal opening 29 along the length thereof. When a different slot depth is necessary, the cam 28 and pin 30 is removed from its present slot and moved either forward or backwards to another slot in which it is positioned. While three such transfer slots of different depths with the depth varying from deepest to shallowest are shown, it is understood that many different arrangements are possible.

Figure 11:
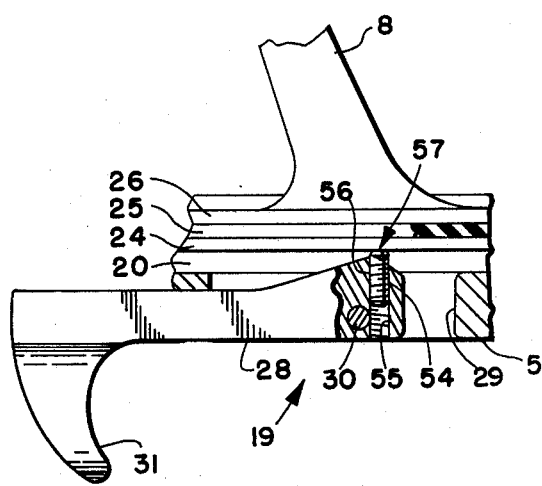
FIG. 11 is an enlarged fragmentary view mostly in section of the cam locking mechanism depicting one arrangement of the set screw within the cam locking mechanism.
Figure 12:
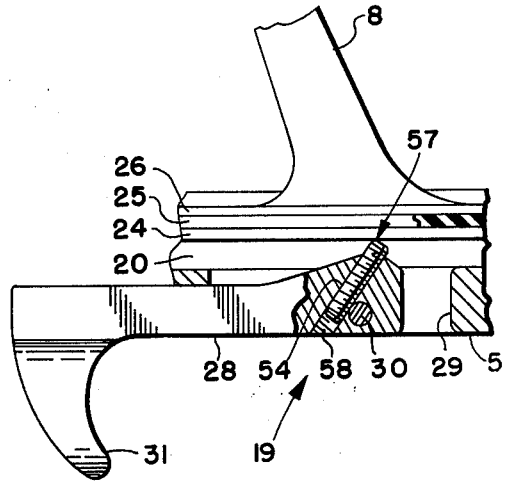
FIG. 12 is an enlarged fragmentary view, mostly in section, of the cam locking mechanism, similar to FIG.

Alternatively, the cam locking mechanism 19 may include a set screw 54 positioned in an interiorly threaded hole 55 in the cam 28 as best shown in FIGS. 11 and 12. The set screw protrudes from the cam 28 forming a highest point 57 on the cam surface 56 forwardly of the pivot pin 30 when in the full locked position, thus forming an overcenter cam surface. The set screw 54 provides an adjustable extension of the cam surface 56 into the cavity 20 for accommodating different sized reel base mounting plates in the holder. Thus, the same result is achieved as when the cam is moved from one transfer slot to another as in the FIGS. 1, 2 and 4 embodiment.

The hole for the set screw 54 may be completely forward of the pivot pin 30 as shown in FIG. 11 or angularly positioned as shown in FIG. 12. The interiorly threaded bore 58 of FIG. 12 extends from a position rearward of the pin 30 at the bottom of the cam 28 upward obliquely so that the set screw 54 extends outwardly forward of the pin 30 thus forming an overcenter cam surface. The set screw 54 may be extended or retracted as desired by turning the set screw 54 with an Allen wrench (not shown) depending on the size of the base plate accommodated within the cavity 20 and releasably locked in place.

Referring more particularly to FIG. 6, a rigid rod-like threading shuttle 32 is shown for threading the line 34 through the rod portion 2. The threading shuttle 32, which is desirably about 2½ inches long and of an outer diameter somewhat less than the inner diameter of the rod portion 2 for ready passage therethrough, has a notch 33 at one end thereof about which the line 34 is secured. The shutter 32 is initially inserted into the universal guide 6 adjacent the inner end of the rod portion 2 (see FIG. 1) and then may be cast through the rod portion 2 out the other end thereof for threading of the fishing line 34 with relative ease.

The fishing rod 2 may also be provided with a tip roller guide, generally designated at 35 in FIGS. 7 and 8, which is particularly useful for deep-sea fishing, to reduce the line drag when reeling in large fish. One end of the tip roller guide desirably consists of a cylindrical coupling 36 with a tapered cylindrical interior 37 for insertion over the outermost end of the tapered rod portion 2. The other end of the tip roller guide includes a body 38 having side walls 38a and 38b and top wall 38c with an opening 39 therein for passage of the fishing line 40. Between the walls 38a and 38b are positioned two rollers 41 rotatably mounted around pivots 42 with their outer peripheries in close proximity to each other in substantial axial alignment with the axial center of the tip roller guide and rod portion 2. As best seen in FIG. 8, the rollers 41 have a groove 43 around their circumference for receipt of line 40. The spacing between the two rollers is such that the line 40 is retained in the grooves 43 of the respective rollers 41 as the line 40 passes over the rollers 41.

A handle portion 44 located at the rear end of the rear handle portion 5 may include a bicycle-type hand grip 45 or the like, and such handle portion 44 may also have a cavity 46 therein accessible by removal of an end cap 47, as shown in FIG. 9. The end cap 47 is shown secured to the handle 44 by externally threaded extension 48 engaging the handle portion 44 at the internally threaded portion 49 thereof.

Figure 10:
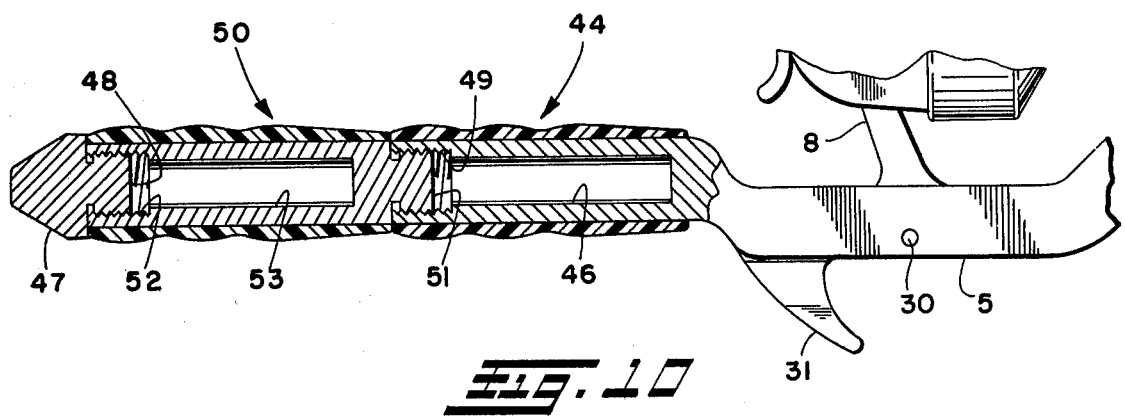
FIG. 10 is a fragmentary side elevation view, partly in section, of the handle part of the holder portion with the handle extension attached thereto.

A separate handle extension 50 is shown attached to the handle portion 44 in FIG. 10. The handle extension 50 has an externally threaded extension 51 which engages the internally threaded portion 49. The handle extension 50 may also have a cavity 53 therein accessible by removal of an end cap 47 attached to the other end of the handle extension 50 at the internally threaded portion 52 thereof.

With the fishing rod as described above, reels of considerably different dimensions may be used. To attach the fishing reel to the rod, the cam locking mechanism 19 is adjusted by positioning the pin 30 in one of the several transfer slots 31 depending on the size of the reel base plate 26 to determine the extension of the cam 28 into the cavity 20. Alternatively or in addition thereto, the set screw 57 may be extended or retracted also depending on the size of the reel base plate 26. The reel base plate 26 is then inserted into the cavity 20 and positioned underneath the top wall 21, and the cam 28 is rotated thus urging the locking plate 24 against the reel base plate 26 into abutment with the top wall 21 of the cavity 20. When in the full locked position, the reel 8 is firmly secured to the holder portion 3.

After securely attaching the reel 8 to the holder portion 3, the universal guide 6 is aligned with the reel 8 by the guide adjusting mechanism 10. The screws 15 are removed and the front holder portion 5 is slid relative to the rear holder portion 5 to properly align the universal guide 6 with the fishing reel 8. When in proper alignment, the screws 15 are reinserted through the outer extension 12 of the front holder portion 4 into the corresponding threaded holes 18 of the internal extension 14 thus interconnecting the holder parts.

The line is then withdrawn from the reel and tied around the notch 33 of the shuttle 32. The shuttle 32 is placed in the universal guide 6 and cast out through the hollow rod portion 2 until received at the outer end thereof. The line is then disconnected from shuttle shutter 32. When fishing for relatively large fish, particularly when deep-sea fishing, the tip roller guide 35 may be used to reduce line drag. The line is threaded through the tip roller guide 35 and then the roller guide 35 is attached to the end of the rod portion 2.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. An apparatus for mounting and securing a reel to the holder portion of a fishing rod having a rear holder portion comprising cavity means in said rear holder portion for receiving the base mounting plate of a reel, said cavity means having a top, bottom and side walls, cam means extending into said cavity means for urging the base mounting plate into abutment with said top wall of said cavity means thereby locking the reel to said rear holder portion, and means for varying the maximum extent of protrusion of said cam means into said cavity means when in the locked position to accommodate different sized reel base mounting plates.

2. An apparatus as set forth in claim 1 further comprising a movable locking plate disposed in said cavity means which is urged against the bottom side of the base mounting plate by said cam means, and resilient means on the upper surface of said locking plate for compressively engaging the base mounting plate to tightly hold the same.

3. An apparatus as set forth in claim 1 wherein said means for varying the maximum extent of protrusion of said cam means comprises an adjustable set screw carried by said cam means providing an adjustable extension of said cam means, the outer end of said set screw forming the furthest point of said cam means within said cavity means, said furthest point being so angularly positioned on said cam means such that upon pivotal movement of said cam means to a full locked position, said furthest point is overcenter relative to the pivotal axis of said cam means for retaining said cam means in such locked position.

4. An apparatus as set forth in claim 1 further comprising a tip guide having respective ends, roller means mounted at one end of said tip guide for guiding a fishing line, and coupling means mounted at the other end of said tip guide for coupling with the rod portion.

5. An apparatus as set forth in claim 1 further comprising handle means for manually grasping the fishing rod, handle extension means having respective ends for additionally manually grasping the fishing rod, means for connecting one end of said handle extension means to said handle means, and a cap connected to the other end of said handle extension means.

6. An apparatus as set forth in claim 5 wherein said handle means and handle extension means are hollow for storage of fishing lures and the like.

7. An apparatus as set forth in claim 1 further comprising a generally cylindrical shuttle having a diameter less than that of the hollow of said rod portion, and a notch at one end of said shuttle about which a fishing line is tied.

8. An apparatus as set forth in claim 7 wherein said shuttle is of relatively short length with respect to said rod portion.

9. An eyeless fishing rod comprising a rod portion, a front holder portion having guide means for guiding a fishing line into said rod portion, a rear holder portion having means for securing a reel and handle means for manually grasping the fishing rod, and means for adjustably connecting said front holder portion to said rear holder portion for varying the spacing between said rear holder portion and guide means to align said guide means with the line guides of different size reels, said means for adjustably connecting including an outer extension on one of said holder portions, an inner extension on the other of said holder portions slidably movable in said outer extension during adjustment, and means for fastening said outer extension and said inner extension together to prohibit relative movement after adjustment.

10. The fishing rod as set forth in claim 9 wherein said means for fastening includes three equally spaced threaded bores in said inner extension, and two similarly spaced screw means extending through openings in said outer extension for threadably engaging two of said threaded bores.

11. The fishing rod as set forth in claim 9 wherein said inner extension is angularly disposed from said rear holder portion so that a vertical displacement results during adjustment.

12. The fishing rod of claim 9 wherein said means for securing a reel includes cavity means in said rear holder portion for receiving the base mounting plate of a reel, said cavity means having a top, bottom and side walls, a movable locking plate disposed in said cavity means, cam means extending into said cavity means directly engageable with said movable locking plate for urging said locking plate against the base mounting plate to cause abutment of the latter with said top wall of said cavity means thereby locking the reel to said rear holder portion, and means for varying the maximum extent of protrusion of said cam means into said cavity means when in the locked position to accommodate different sized base mounting plates.

13. The fishing rod of claim 9 further comprising handle extension means having respective ends for additionally manually grasping the fishing rod, means for connecting one end of said handle extension means to said handle means, and a cap connected to the other end of said handle extension means.

14. The fishing rod of claim 9 further comprising a tip guide having respective ends, roller means mounted at one end of said tip guide for guiding a fishing line, said roller means including two roller guides rotatably mounted to said tip guide, said roller guides being in a common plane and positioned tangentially to one another, and groove means in said roller guides for retaining the fishing line between said roller guides, and coupling means at the other end of said tip guide for coupling with the tip of said rod portion.

15. An apparatus for mounting and securing a reel to the holder portion of a fishing rod having a rear holder portion comprising cavity means in said rear holder portion for receiving the base mounting plate of a reel, said cavity means having a top, bottom and side walls, cam means extending into said cavity means for urging the base mounting plate into abutment with said top wall of said cavity means thereby locking the reel to said rear holder portion, said rear holder portion having a cam opening in said bottom wall of said cavity means through which said cam means extends, pin means for pivotally supporting said cam means, and means for varying the extent of protrusion of said cam means into said cavity means to accommodate different sized real base mounting plates, said last-mentioned means comprising plural transfer slot means in the sides of said cam opening of different depths for receiving said pin means.

16. An apparatus for mounting and securing a reel to the holder portion of a fishing rod having a rear holder portion comprising cavity means in said rear holder portion for receiving the base mounting plate of a reel, said cavity means having a top, bottom and side walls, cam means extending into said cavity means for urging the base mounting plate into abutment with said top wall of said cavity means thereby locking the reel to said rear holder portion, means for varying the extent of protrusion of said cam means into said cavity means to accommodate different sized reel base mounting plates, a tip guide having respective ends, roller means mounted at one end of said tip guide for guiding a fishing line, and coupling means mounted at the other end of said tip guide for coupling with the rod portion, said roller means including two roller guides rotatably mounted to said tip guide, said roller guides being in a common plane and positioned tangentially to one another, and groove means in said roller guides for retaining the fishing line between said roller guides.

* * * * *